United States Patent
Phannavong et al.

(10) Patent No.: US 9,816,724 B2
(45) Date of Patent: Nov. 14, 2017

(54) INTEGRATED VENTILATION UNIT

(71) Applicant: Reznor LLC, Mercer, PA (US)

(72) Inventors: Seng Kham Phannavong, Cypress, TX (US); Christopher Adam Hughes, Lakeland, TN (US); Thomas W Clark, Germantown, TN (US); John P McKissack, Memphis, TN (US); David Street, Germantown, TN (US); Timothy J Roberts, Eureka, MO (US)

(73) Assignee: Reznor LLC, Mercer, PA (US)

( * ) Notice: Subject to any disclaimer, the term of this patent is extended or adjusted under 35 U.S.C. 154(b) by 123 days.

(21) Appl. No.: 14/608,658

(22) Filed: Jan. 29, 2015

(65) Prior Publication Data

US 2015/0198350 A1   Jul. 16, 2015

Related U.S. Application Data

(63) Continuation of application No. 13/150,750, filed on Jun. 1, 2011, now Pat. No. 8,943,848.
(Continued)

(51) Int. Cl.
*F24F 12/00*  (2006.01)
*F24D 15/04*  (2006.01)
(Continued)

(52) U.S. Cl.
CPC .......... *F24F 12/001* (2013.01); *F24D 15/04* (2013.01); *F24F 3/0442* (2013.01);
(Continued)

(58) Field of Classification Search
CPC .. F24F 11/0012; F24F 11/0076; F24F 12/001; F24F 2011/0013; F25B 49/022; F24D 15/04
See application file for complete search history.

(56) References Cited

U.S. PATENT DOCUMENTS 4,113,004 A   9/1978  Rush et al.
4,180,985 A   1/1980  Northrup, Jr.
(Continued)

FOREIGN PATENT DOCUMENTS

CN   1888682 A   1/2007
EP   2397787 A2  12/2011
(Continued)

OTHER PUBLICATIONS

"U.S. Appl. No. 13/150,750, Non Final Office Action mailed Feb. 26, 2014", 9 pgs.
(Continued)

*Primary Examiner* — Marc Norman
(74) *Attorney, Agent, or Firm* — Schwegman Lundberg & Woessner, P.A.

(57) ABSTRACT

An integrated ventilation unit configured to provide ventilation and conditioned air to an indoor space may include a heat pump system, an energy recovery device and a control unit. The heat pump system may include a first coil located at a supply air side of the ventilation unit, a second coil located at an exhaust air side of the ventilation unit, and a compressor. The energy recovery device may be configured to transfer heat between a return air stream and a supply air stream and the control unit may be configured to control operation of the heat pump system and the energy recovery device.

23 Claims, 6 Drawing Sheets

Related U.S. Application Data

(60) Provisional application No. 61/355,200, filed on Jun. 16, 2010.

(51) Int. Cl.
  *F24F 11/00* (2006.01)
  *F25B 49/02* (2006.01)
  *F24F 3/044* (2006.01)
  *F24F 3/14* (2006.01)

(52) U.S. Cl.
  CPC ........ *F24F 3/1423* (2013.01); *F24F 11/0012* (2013.01); *F24F 11/0076* (2013.01); *F24F 12/006* (2013.01); *F25B 49/022* (2013.01); *F24F 2011/0013* (2013.01); *F24F 2012/007* (2013.01); *F24F 2203/104* (2013.01); *F24F 2203/1032* (2013.01); *Y02B 30/12* (2013.01); *Y02B 30/563* (2013.01)

(56) References Cited

U.S. PATENT DOCUMENTS

| | | |
|---|---|---|
| 4,729,774 A | 3/1988 | Cohen et al. |
| 4,948,392 A | 8/1990 | Rush et al. |
| 5,179,998 A | 1/1993 | Des Champs |
| 5,315,844 A | 5/1994 | Hansen |
| 5,325,676 A | 7/1994 | Meckler |
| 5,353,606 A | 10/1994 | Yoho et al. |
| 5,448,895 A | 9/1995 | Coellner et al. |
| 5,517,828 A | 5/1996 | Calton et al. |
| 5,551,245 A | 9/1996 | Calton et al. |
| 5,564,281 A | 10/1996 | Calton et al. |
| 5,579,647 A | 12/1996 | Calton et al. |
| 5,649,428 A | 7/1997 | Calton et al. |
| 5,758,511 A | 6/1998 | Yoho et al. |
| 5,816,065 A | 10/1998 | Maeda |
| 5,826,434 A | 10/1998 | Belding et al. |
| 5,850,741 A | 12/1998 | Feher |
| 5,887,784 A | 3/1999 | Haas |
| 6,199,394 B1 | 3/2001 | Maeda |
| 6,328,095 B1 | 12/2001 | Felber |
| 6,355,091 B1 | 3/2002 | Felber et al. |
| 6,557,365 B2 | 5/2003 | Dinnage et al. |
| 6,575,228 B1 | 6/2003 | Ragland et al. |
| 6,915,655 B2 | 7/2005 | Lee et al. |
| 6,918,263 B2 | 7/2005 | Lee et al. |
| 7,308,798 B2 | 12/2007 | Caggiano |
| 7,389,646 B2 | 6/2008 | Moffitt |
| 7,530,385 B2 | 5/2009 | Liu et al. |
| 7,565,923 B2 | 7/2009 | Liu et al. |
| 7,572,179 B2 | 8/2009 | Choi et al. |
| 7,600,391 B2 | 10/2009 | Naik et al. |
| 7,621,147 B2 | 11/2009 | Schilling |
| 7,654,101 B2 | 2/2010 | Shapiro |
| 8,584,733 B2 | 11/2013 | D'arcy et al. |
| 8,943,848 B2 | 2/2015 | Phannavong et al. |
| 2004/0134211 A1 | 7/2004 | Lee et al. |
| 2005/0050906 A1* | 3/2005 | Dinnage ............... F24F 3/1405 62/94 |
| 2005/0262862 A1 | 12/2005 | Moffitt |
| 2007/0079623 A1 | 4/2007 | Inaba et al. |
| 2008/0000630 A1 | 1/2008 | Haglid |
| 2008/0209928 A1 | 9/2008 | Hwang et al. |
| 2011/0146965 A1 | 6/2011 | Gloeckner et al. |
| 2011/0308265 A1 | 12/2011 | Phannavong et al. |

FOREIGN PATENT DOCUMENTS

| | | |
|---|---|---|
| JP | 2004257588 A | 9/2004 |
| JP | 2007024377 A | 2/2007 |

OTHER PUBLICATIONS

"U.S. Appl. No. 13/150,750, Notice of Allowance mailed Aug. 12, 2014", 5 pgs.

"U.S. Appl. No. 13/150,750, Notice of Allowance mailed Oct. 2, 2014", 5 pgs.

"U.S. Appl. No. 13/150,750, Response filed May 30, 2014 to Non Final Office Action mailed Feb. 26, 2014", 13 pgs.

"Mexican Application Serial No. MX/a/2011/006309, Office Action mailed Feb. 10, 2014", (w/ English Translation), 6 pgs.

"Mexican Application Serial No. MX/a/2011/006309, Office Action mailed Oct. 3, 2013", (w/ English Translation), 7 pgs.

"European Application Serial No. 11169708.2, Extended European Search Report mailed May 13, 2016", 7 pgs.

\* cited by examiner

INTEGRATED VENTILATION UNIT

RELATED APPLICATION

This application is a Continuation of application Ser. No. 13/150,750, filed Jun. 1, 2011, which claims priority under 35 U.S.C. §119 based on U.S. Provisional Patent Application No. 61/355,200, filed Jun. 16, 2010, the disclosure of which are hereby incorporated herein by reference.

BACKGROUND INFORMATION

Industry standards for improved indoor air quality are requiring higher amounts of outside air for ventilation. These building standards are placing increased importance on achieving comfortable and healthy indoor living conditions with greatly reduced energy consumption. Conventional heat pump and energy recovery technologies typically exist as separate components that are used in space heating and air-conditioning systems. These conventional space conditioning units are sometimes applied to high dilution ventilation applications, either as separate or field combined components. This solution is not primarily designed for high outside air ventilation applications. As a result, this solution presents a mechanically complex and inferior system and one in which the performance solution is non-integrated and inefficient with regards to energy.

In addition, conventional heat pump and energy recovery units are typically not integrated from a control perspective. This causes many problems for building engineers and other personnel tasked with attempting to operate the units in an efficient manner.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Embodiments described herein provide a device that exhausts a given amount of indoor air to the outdoors while delivering a near equal amount of outdoor air to an indoors space or other equipment for ventilation purposes. In an exemplary implementation, the device operates on two different air streams, a fresh air stream and a return/exhaust air stream. The device has a relatively compact design and is energy efficient to allow it to transfer energy between the exhaust air stream and the fresh air stream. The transferred energy "conditions" the fresh air such that it heats/cools the air to a desired leaving air temperature and may also remove excess humidity. For example, in the winter, the cold outdoor air is heated by the warmer indoor air. In the summer, the hot outdoor air is cooled by the colder indoor air. As a result, a large reduction of external power (e.g., electricity or other fuel) to condition the entering fresh air may be obtained. The device may also include an integrated control unit that controls each component to maximize the overall efficiency of the device.

Figure 1A:
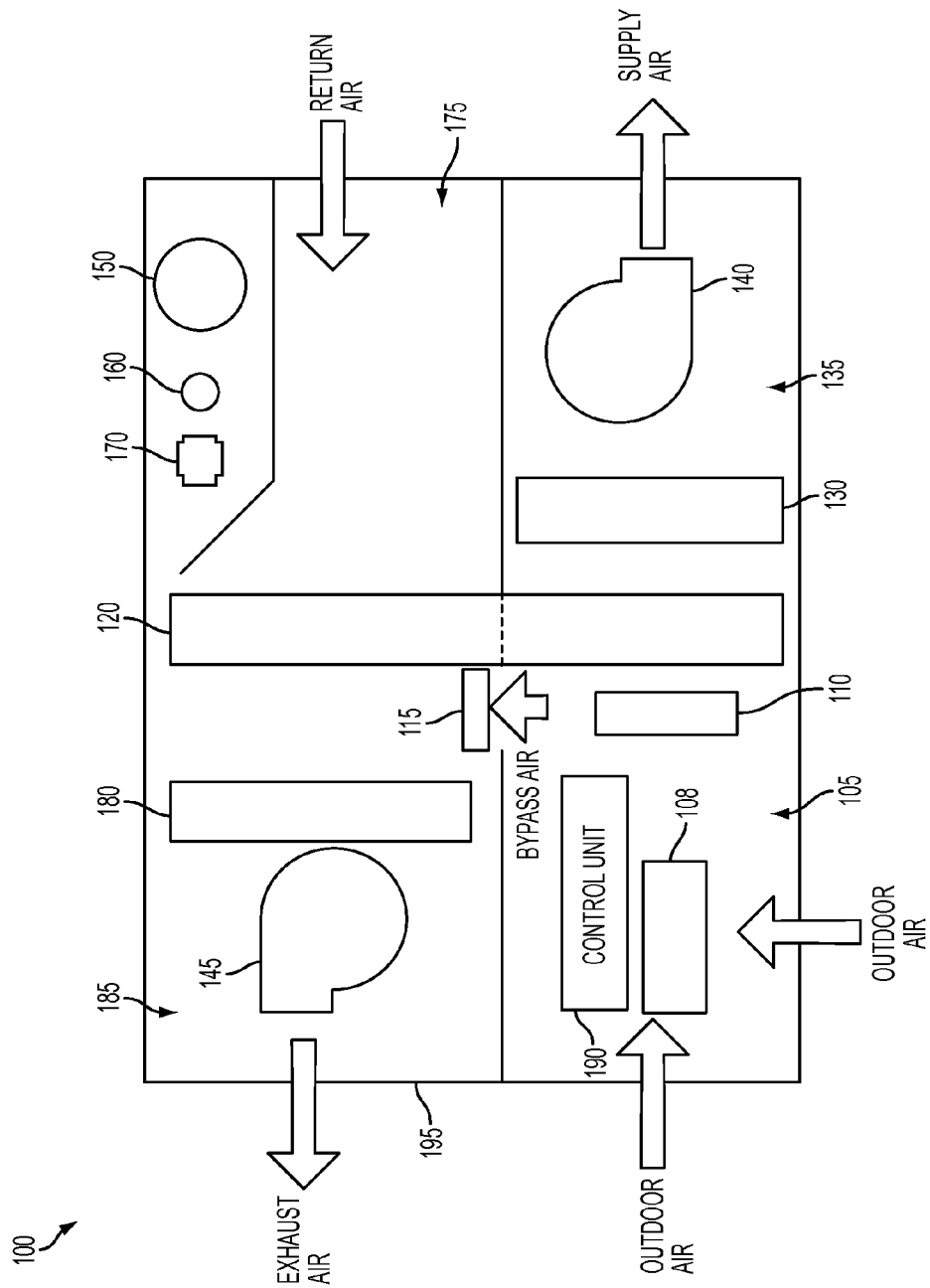
FIGS. 1A and 1B are schematic diagrams of a ventilation unit consistent with an exemplary implementation.

FIG. 1A is a schematic view of a ventilation unit 100 in accordance with an exemplary implementation. Referring to FIG. 1A, ventilation unit 100 may include intake air chamber 105, filters 108, accessory pre-heater 110, damper 115, energy recovery device 120, evaporator/condenser coil 130, supply air chamber 135, air mover devices 140 and 145, compressor 150, accumulator 160, four-way valve 170, return air chamber 175, condenser/evaporator coil 180, exhaust air chamber 185, control unit 190 and enclosure 195. The exemplary configuration illustrated in FIG. 1A is provided for simplicity. It should be understood that ventilation unit 100 may include more or fewer devices than illustrated in FIG. 1A.

Intake air chamber 105 may include an air intake area in which outdoor air may be received. For example, the external portions of ventilation unit 100 located adjacent chamber 105 may include louvered openings or other types of openings to receive outdoor air. Filters 108 may include one or more filters used to filter the outdoor air received via intake air chamber 105.

Accessory pre-heater 110 (also referred to herein as heater 110 or pre-heater 110) may include a heating element (e.g., an electrical heater) used to pre-condition outdoor air received in chamber 105. Based on the operating conditions, such as the temperature of the outdoor air, heater 110 may heat the outdoor air prior to further conditioning the outdoor air, as described in detail below. In some implementations, pre-heater 110 may not be included in ventilation unit 100.

Damper 115 may include one or more dampers used to control the amount of bypass air provided to coil 180, as described in more detail below. In one implementation, damper 115 may be motorized to control the opening/closing or degree of opening/closing of damper 115 to allow the amount of bypass air passing to coil 180 to be precisely controlled, as described in more detail below.

Energy recovery device 120, also referred to herein an enthalpy device 120, may be a total enthalpy device that transfers energy in the form of heat and moisture between a return air stream and an incoming air stream. In another implementation, energy recovery device 120 may be a sensible device that transfers heat energy only. For example, in one implementation, energy recovery device 120 may include an enthalpy wheel that rotates to transfer both heat and moisture. In other implementations, energy recovery device 120 may include a plate that operates to transfer heat and/or moisture. In each case, enthalpy device 120 may be located in ventilation unit 100 such that enthalpy device 120 is the first device in ventilation unit 100 that exchanges air from the return or exhaust air stream to the fresh air stream. Such a location may allow energy recovery device 120 to initially condition the fresh air with a minimal amount of energy. In some instances, if energy recovery device 120 conditions the air adequately based on the desired air leaving temperature/humidity conditions, the heat pump system (i.e., evaporator/condenser coil 130, compressor 150, condenser/evaporator coil 180, etc.) may not have to perform further conditioning of the air or may perform minimal conditioning of the air.

Supply air chamber 135 may include an area in which air from energy recovery device 120 and evaporator/condenser coil 130 are received and supplied to a building space, represented by the arrow labeled supply air in FIG. 1A.

Evaporator/condenser coil 130, compressor 150, accumulator 160, four-way valve 170 and condenser/evaporator coil 180 may operate as elements of a heat pump system included within ventilation unit 100. In an exemplary implementation, the heat pump system may be a direct expansion (DX) system that is able to provide cooling and heating based on the particular operating conditions (i.e., cooling mode or heating mode). For example, during the cooling mode, coil 130 may operate as an evaporator and coil 180 may act as a condenser to aid in further conditioning the air to be provided to an indoor space. During the heating mode, coil 130 may act as a condenser and coil 180 may act as an evaporator. In an exemplary implementation, the location of evaporator/condenser coil 130 allows ventilation unit 100 to control the air to the precise temperature and humidity. The location of the evaporator/condenser coil 130 in the supply air stream and condenser/evaporator coil 180 in the exhaust air stream allows the heat pump system to act as an energy recovery device that transfers heat from one air stream to the other. As a result of the placement or location of the coils 130 and 180, ventilation unit 100 may achieve lower energy usage and lower defrost control, as compared to conventional systems. In addition, the location of coils 130 and 180 with respect to energy recovery device 120 may lower supplemental heat requirements associated with the indoor space. As described above, the air received by evaporator/condenser coil 130 may be pre-conditioned by energy recovery device 120 and/or heater 110. As a result, ventilation unit 100 uses less energy than that used in conventional systems over the entire range of expected outdoor air conditions (e.g., in both heating and cooling modes).

Compressor 150, as described above, may operate as part of a heat pump system included in ventilation unit 100. In an exemplary implementation, compressor 150 may be a variable speed compressor that is optimized to provide conditioned air according to a user's requirements, as described in more detail below.

Accumulator 160 and four way valve 170 may represent a conventional accumulator and four-way valve, respectively, in the heat pump system. For example, accumulator 160 may act to protect compressor 150 from liquid refrigerant in a suction line coupled to compressor. Four-way valve 170 may be coupled to compressor 150 and accumulator 160. Four-way valve 170 may permit passage of refrigerant to coils 130 and 180 based on whether the heat pump system is operating in the cooling or heating mode.

Condenser/evaporator coil 180 may operate in conjunction with coil 130 to exchange heat from one source to another. For example, in one implementation, condenser/evaporator coil 180 may be part of the DX heat pump system which includes coil 130, compressor 150, accumulator 160 and four-way valve 170 to allow heat to be exchanged from one source to another. The location of condenser coil 180 within the exhaust air stream allows condenser coil 180 to act as an energy recovery device. For example, the arrow labeled "bypass air" in FIG. 1A represents a passageway or opening between the supply air side and exhaust air side of ventilation unit 100. Damper 115, as described above, may be positioned to control the amount of bypass air that is supplied to the exhaust air side of ventilation unit 100. The bypass air corresponds to a portion of the outdoor air that is received in intake air chamber 105 and is diverted through the opening to the exhaust air side and coil 180. By providing a portion of the bypass air to coil 180, coil 180 and the heat pump system may operate in a more efficient manner than conventional systems, as described in more detail below. In addition, the location of coils 180 downstream of energy recovery device 120 (with respect to the return air flow) allows ventilation unit 100 to recover more energy than other systems, and also use the least amount of energy to condition the fresh air. For example, coil 180 acts as a condenser during the cooling mode of heat pump system. Since the condenser coil 180 is located in the exhaust air stream, the heat pump system may use the energy from the exhaust air to aid in cooling the entering fresh air stream.

Air mover devices 140 and 145 may each include one or more fans or other air moving devices. For example, air mover device 140 may be a supply fan to supply conditioned air to an interior space (e.g., an office, school, restaurant, etc.). Air mover device 145 may be an exhaust fan used to exhaust air to the outside.

Return air chamber 175 may include an area in which air from an indoor space may be received. For example, return air chamber 175 may interface with duct work from the interior space to receive the return air from the indoor space. Return air chamber 175 may include openings to receive the return air via vertical and/or horizontal entrances.

Exhaust air chamber 185 may include an area in which return air that passes through energy recovery device is received and expelled to the outdoors. In an exemplary implementation, exhaust air chamber 185 may include louvers or other openings to expel the air from one or more sides and/or the top of ventilation unit 100, as described in more detail below.

In an exemplary implementation, coils 130 and 180 are designed for optimum performance in direct relationship to energy recovery device 120. For example, heat transfer surfaces of coils 130 and 180 may be designed to optimize heat transfer. Coils 130 and 180 (as well as the entire DX heat pump system), along with energy recovery device 120, allow ventilation unit 100 to act in totality as an energy recovery device exchanging useful energy between the two air streams. In particular, coils 130 and 180 and energy recovery device 120 are designed to maximize the overall energy and conditioning performance of ventilation unit 100 within the expected range of outdoor air conditions.

Control unit 190 may include monitoring and control devices use to control the overall operation of ventilation unit 100. For example, control unit 190 may include sensors and/or monitors to measure the incoming air temperature, outgoing air temperature, incoming/outgoing humidity levels, etc., as described in more detail below. In an exemplary implementation, control unit 100 may be an integrated control unit that controls the operation of each component of ventilation unit 100 such that ventilation unit 100 operates in an efficient manner, as described in detail below.

Enclosure 195 may include a structure used to house the components of ventilation unit 100. In an exemplary implementation, enclosure 195 may be metal. In other implementations, other materials may be used. In each case, ventilation unit 100 may used as a roof mounted unit, a ceiling mounted unit, a through the wall unit, an indoor floor unit, or any other configuration.

As described above, control unit 190 may be an integrated unit that controls the operation of each component of ventilation unit 100, along with the operation of ventilation unit 100 as a whole. Control unit 190 may facilitate the provisioning of fresh air for ventilation purposes, as well as conditioning the fresh air for an indoor space in an efficient manner, as described in detail below.

Figure 1B:
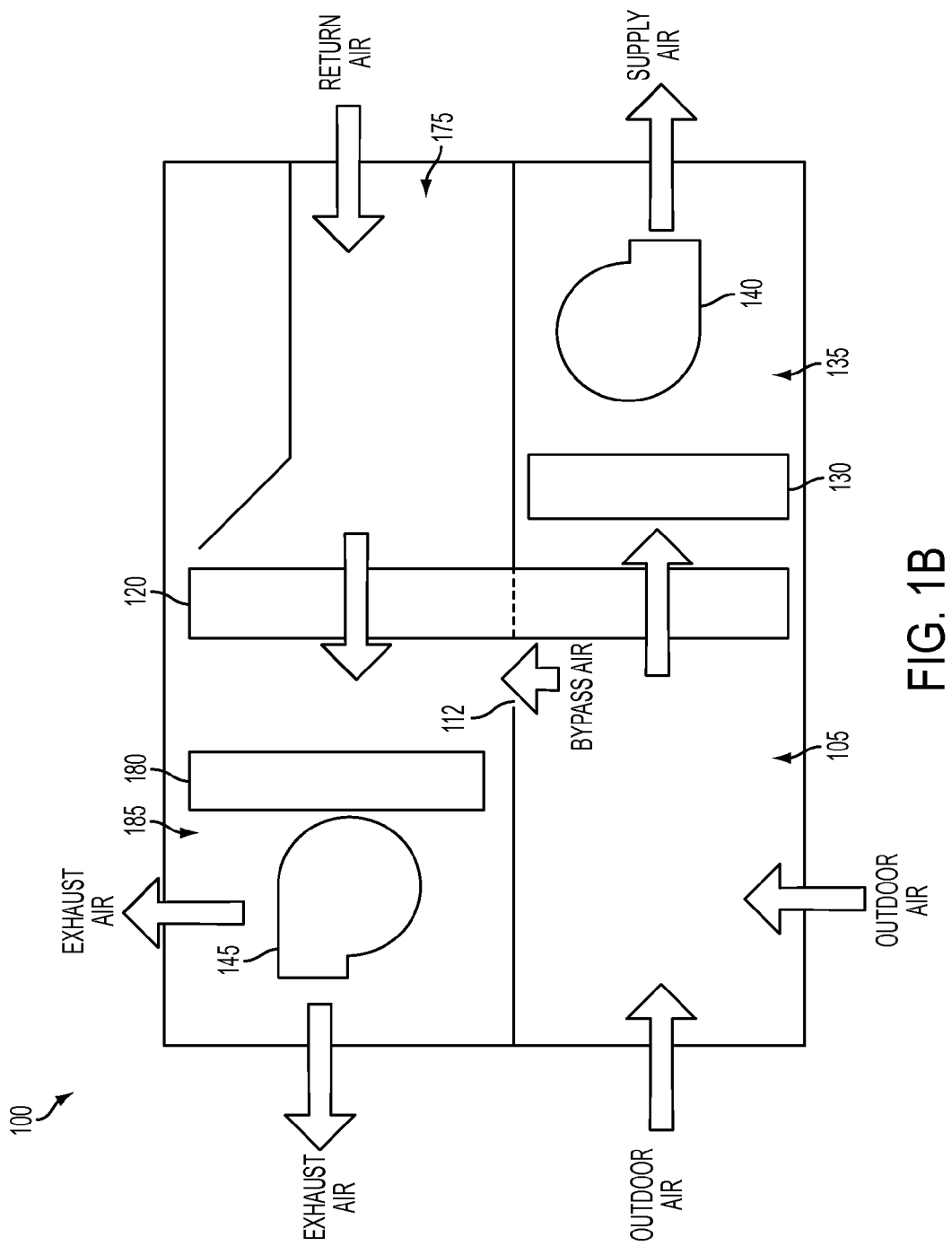

FIG. 1B illustrates a schematic view of ventilation unit 100 of FIG. 1A illustrating air flows in ventilation unit 100. Various components of ventilation unit 100 are not shown in FIG. 1B for simplicity (e.g., pre-heater 110, damper 115, etc.) and to more clearly illustrate the air flows in ventilation unit 100. As illustrated in FIG. 1B, outdoor air may enter intake air chamber 105 from the sides, as indicated by the arrows labeled outdoor air. Outdoor air may also enter intake air chamber 105 via a top side and/or bottom side of ventilation unit 100.

In each case, a portion of the outdoor air may flow from outdoor intake air chamber 105 to exhaust air chamber 185 via area 112, as illustrated by the arrow labeled bypass air. In an exemplary implementation, area 112 may include damper 115 (FIG. 1A) that allows control unit 190 to automatically set the opening or degree of opening of damper 115 to precisely control the volume of bypass air being provided to exhaust air chamber 185, and to coil 180. For example, as described above, in one implementation, damper 115 may be motorized and open/close based on commands from control unit 190. In other implementations, a building engineer or other maintenance personnel may manually set damper 115 to control the amount of bypass air provided to exhaust air chamber 185. In still other implementations, area 112 may not include a damper and may be open to allow bypass air to flow to exhaust air chamber 185.

As also illustrated in FIG. 1B, the portion of outdoor air that is not redirected to exhaust air chamber 185 is provided to energy recovery device 120 and to evaporator/condenser coil 130 in supply air chamber 135. Air mover device 140 may supply air from supply air chamber 135 to the indoor space, as indicated by the arrow labeled supply air.

On the return side, return air chamber 175 may be connected to duct work or other components to receive air from the indoor space, as illustrated by the arrow labeled return air in FIG. 1B. After the return air passes through energy recovery device 120, the return air enters exhaust air chamber 185. Return air received via return air chamber 175 and bypass air from intake air chamber 105 are provided to condenser/evaporator coil 180. Exhaust air is then expelled from ventilation unit 100 via louvers or openings in exhaust air chamber 185, as indicated by the arrows labeled exhaust air in FIG. 1B. In some implementations, exhaust air may be expelled through one or more sides of ventilation unit 100. In addition, in some implementations, exhaust air may be expelled through the top surface and/or bottom surface of exhaust air chamber 100. Ventilation unit 100 may include hoods or other devices to aid in directing the exhaust air away from ventilation unit 100. In each case, ventilation unit 100 provides ventilation air at the desired conditions to provide good indoor air quality, as well as increase overall tenant comfort in the indoor space.

Figure 2:
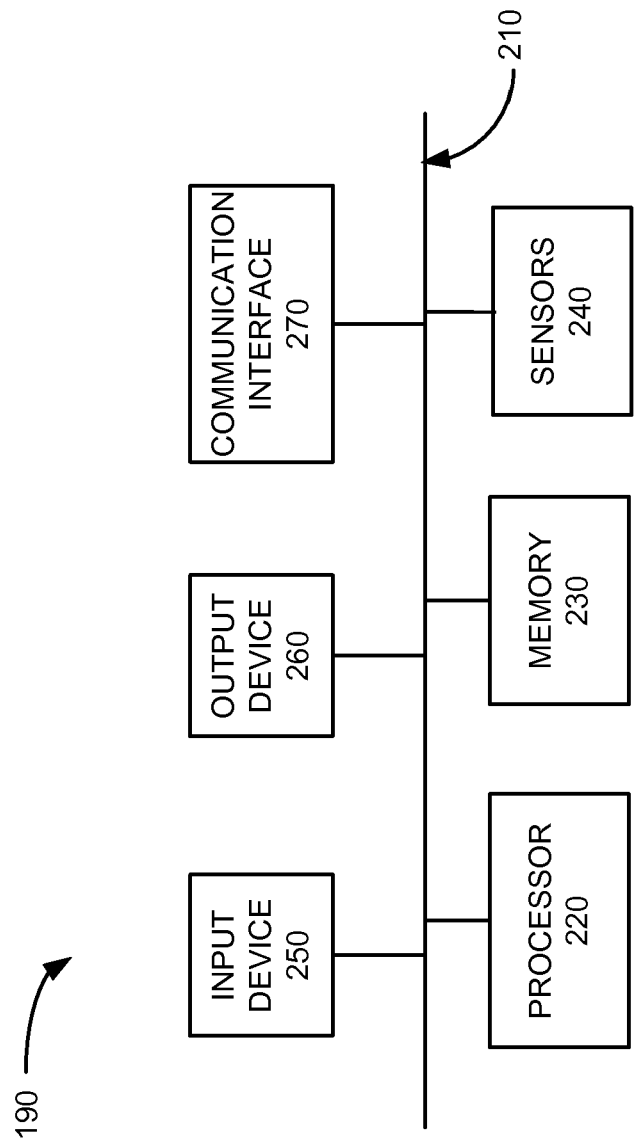
FIG. 2 is a functional block diagram of an exemplary control unit included in the ventilation unit of FIG. 1.

FIG. 2 illustrates an exemplary configuration of control unit 190. Referring to FIG. 2, control unit 190 may include a bus 210, a processor 220, a memory 230, sensors 240, input device 250, output device 260 and communication interface 270. Bus 210 may include a path that permits communication among the elements of control unit 190.

Processor 220 may include one or more processors, microprocessors, application specific integrated circuits (ASICs), field programmable gate arrays (FPGAs) or other processing logic that may interpret and execute instructions. Memory 230 may include a random access memory (RAM) or another type of dynamic storage device that may store information and instructions for execution by processor 220. Memory 230 may also include a read only memory (ROM) device or another type of static storage device that may store static information and instructions for use by processor 220. Memory 230 may further include a solid state drive (SDD). Memory 230 may also include a magnetic and/or optical recording medium (e.g., a hard disk) and its corresponding drive. In an exemplary implementation, a building engineer or technician may interact with processor 220 via a user interface to set various operating parameters, such as desired conditions for an interior space. Processor 220 may store these values in memory 230. Processor 220 may then automatically interact with elements of ventilation unit 100 to allow ventilation unit to produce the desired air conditions, as described in detail below.

Sensors 240 may include one or more sensors used to measure and/or sense operating conditions associated with ventilation unit 100. For example, sensors 240 may include a temperature sensor used to measure air temperature in chamber 105 (e.g., incoming air temperature), a temperature sensor to measure the air temperature leaving heater 110, the air temperature entering energy recover device 120, the air temperature leaving energy recovery device 120, the air temperature of the return air in chamber 175, etc. Sensors 240 may also include one or more sensors to measure relative humidity, air volume, air quality, air pressure, air enthalpy refrigerant pressure, refrigerant flow, compressor power, compressor status, fan motor power, fan motor status, and other conditions of the air or condition of the components at various locations in the supply air side and return/exhaust air side of ventilation unit 100, as well as measure indoor and outdoor humidity conditions, etc. Processor 220 may use these values to control the operation of ventilation unit 100.

Input device 250 may include a mechanism associated with a user interface that permits a user to input information to control unit 190, such as a keypad, a keyboard, a mouse, a pen, a microphone, a touch screen, voice recognition and/or biometric mechanisms, etc. Input device 250 may also include an interface for receiving external inputs, such as inputs from other devices in ventilation unit 100. Output device 260 may include a mechanism associated with the user interface that outputs information to the user, including a display, a printer, a speaker, etc. Output device 260 may also include an interface for providing outputs, such as control signals, to other devices in ventilation unit 100.

Communication interface 270 may include a transceiver or similar mechanism that control unit 190 may use to communicate with other devices, such as other devices within control unit (e.g., processor 220, sensors 240, etc.), or communicate with devices located externally from ventilation unit 100. In some implementations, communication interface 270 may allow control unit 190 to communicate with processors and/or sensors located on other components of ventilation unit 100. For example, in some instances, components such as energy recovery device 120, coils 130 and 180, compressor 150, air mover devices 140 and 145 may include sophisticated computer control systems. In such instances, communication interface 270 may interface with these other control systems.

In each case, communication interface 270 may include mechanisms for communicating with control unit 190 via wired, wireless or optical mechanisms. In an exemplary implementation, communication interface 270 may include a modem or an Ethernet interface to a LAN or other mechanisms for communicating via a network to allow a building engineer or other personnel to receive information from control unit 190 for monitoring purposes and/or to program control unit 190 from a remote location.

The exemplary configuration illustrated in FIG. 2 is provided for simplicity. It should be understood that control unit 190 may include more or fewer devices than illustrated in FIG. 2. For example, one or more power supplies or other components may be included in control unit 190.

Figure 3A:
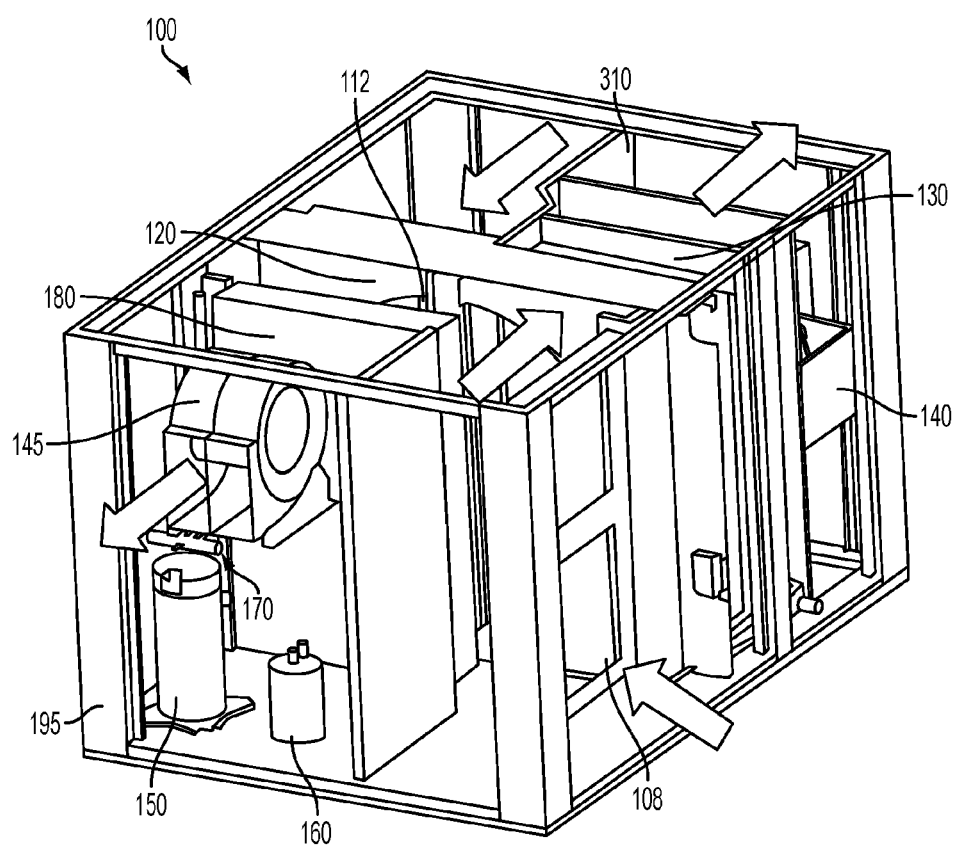
FIG. 3A is a three-dimensional graphical view illustrating components of the ventilation unit of FIG. 1.

FIG. 3A illustrates a three dimensional graphical view of ventilation unit 100. Referring to FIG. 3A, ventilation unit 100 includes elements 110-190 contained in enclosure 195. The sides of enclosure 195 are not shown in FIG. 3A. As illustrated, elements 110-190 are contained in a single enclosure, as opposed to conventional systems in which various elements associated with providing ventilation and condition of air for an interior space are located remotely from one another. In particular, the elements of the heat pump system (e.g., elements 130, 150, 160, 170 and 180) and energy recovery device 120 are located in close proximity to one another. This allows for more efficient transfer of energy between the return air stream and the supply/outdoor air stream. As also illustrated in FIG. 3A, the return air stream and supply air stream are separated from one another by partition 310, which may include sheet metal, duct work, etc.

In an exemplary implementation, intake air chamber 105 may include one or more filters 108 used to filter the outdoor air, as illustrated in FIG. 3A. As discussed above, in an exemplary implementation, "bypass air" is diverted from the intake air chamber 105 to coil 180 located on the exhaust air side of ventilation unit 100. This bypass air increases the heat pump performance, as well as the overall efficiency of ventilation unit 100. For example, after the outdoor air enters intake air chamber 105 via the outdoor air intake and passes through filters 108, a portion of the outdoor air enters the area between energy recovery device 120 and coil 180, illustrated as area 112 in FIG. 3A, and provides additional energy transfer for coil 180. Bypass air area 112 may be sized and/or controlled to allow the appropriate amount of bypass air, based on the particular operating conditions.

For example, as described above with respect to FIG. 1A, in one implementation, damper 115 may be located in area 112 to control the amount of bypass air provided to exhaust air chamber 185 and coil 180. In one implementation, control unit 190 may control the opening/closing of damper 115, or the degree of opening/closing of damper 115 to divert approximately 35% to 65% of the outdoor air entering intake air chamber 105 to exhaust air chamber 185. In other implementations, other percentages of outdoor air may be diverted to exhaust air chamber 185. In each case, coil 180 located on the exhaust air side of ventilation unit 100 may receive a greater volume of air than coil 130 located on the supply air side of ventilation unit 100. In an exemplary implementation, coil 180 may receive one and one half times the air volume or more (e.g., two or three times the air volume) as coil 130. This allows the heat pump system to operate in an efficient manner, as well as operate to transfer energy as part of the total energy transfer performed by ventilation unit 100.

Figure 3B:
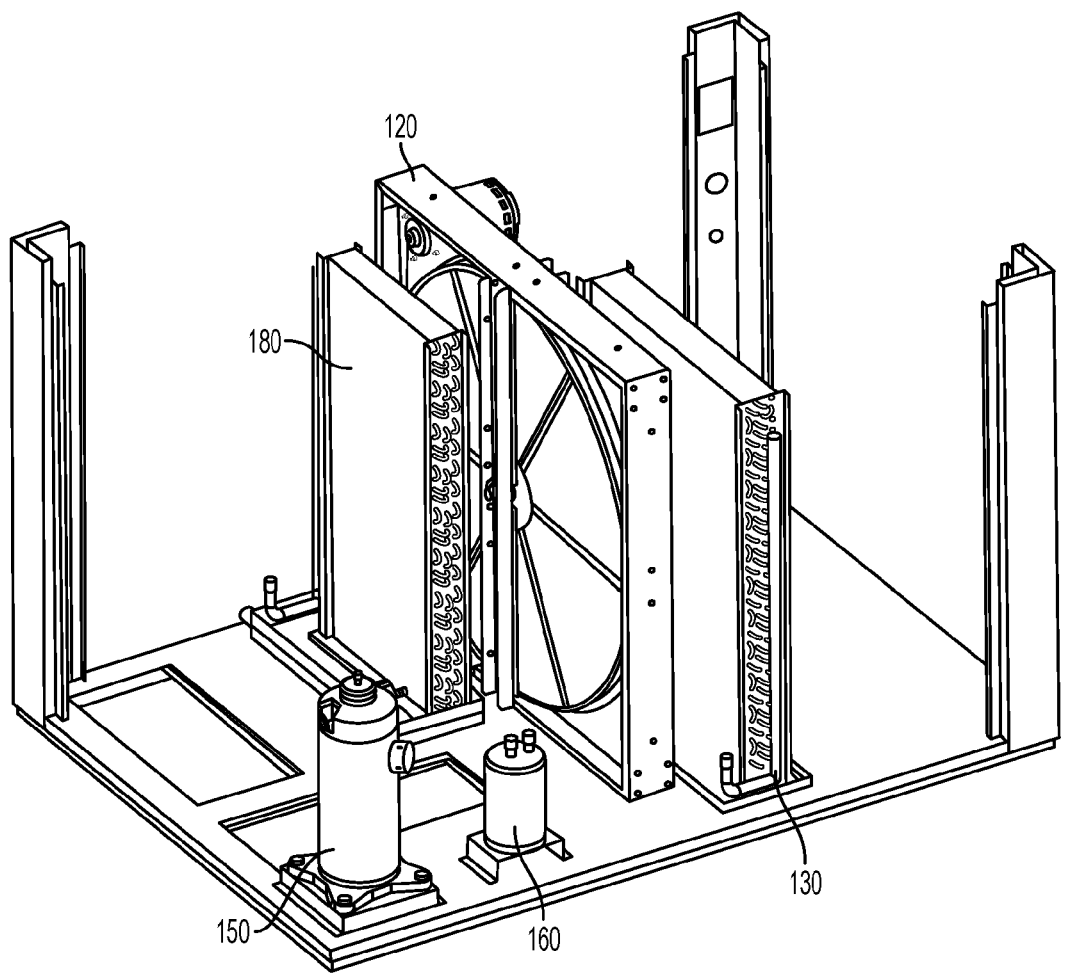
FIG. 3B is an isometric view of a portion of the ventilation unit of FIG. 3A.

FIG. 3B is an isometric view of a portion of the components of ventilation unit 100. In FIG. 3B, fans 140 and 145 and other devices (e.g., filters 108, duct work 310 separating the portions of ventilation unit 100, piping and valves connecting the components, etc.) are not shown for simplicity. For example, coils 130 and 180 may be connected via four-way valve 170 (not shown in FIG. 3B). In addition, coils 130 and 180 may be coupled to each other, compressor 150 and accumulator 160 via piping that carries refrigerant. Four-way valve 170 (FIG. 3A) controls the direction of refrigerant flow based on the particular cycle in which the heat pump is operating (e.g., cooling mode or heating mode). Other devices may be included in the heat pump systems, such as check valves, thermal expansion valves, change over valves, etc., but are not described herein for simplicity.

As described previously, the location of coil 180 downstream of energy recovery device 120 (shown as a wheel in FIG. 3B), allows energy recovery device 120 to obtain a more efficient heat transfer than if coil 180 were located upstream of energy recovery device 120. For example, coil 180 in the DX heat pump system is used as an energy recovery device, as opposed to being used to dry out or re-charge energy recovery device 120 (e.g., a desiccant wheel). This energy recovery allows ventilation unit 100 to operate more efficiently than conventional systems.

As also described above, ventilation unit 100 may include a DX heat pump system and energy recovery device 120 that are integrated from an operational and control standpoint to provide complementary functionality. As a result, ventilation unit 100 may maximize energy recovery and minimize energy consumption, as described in detail below.

Figure 4:
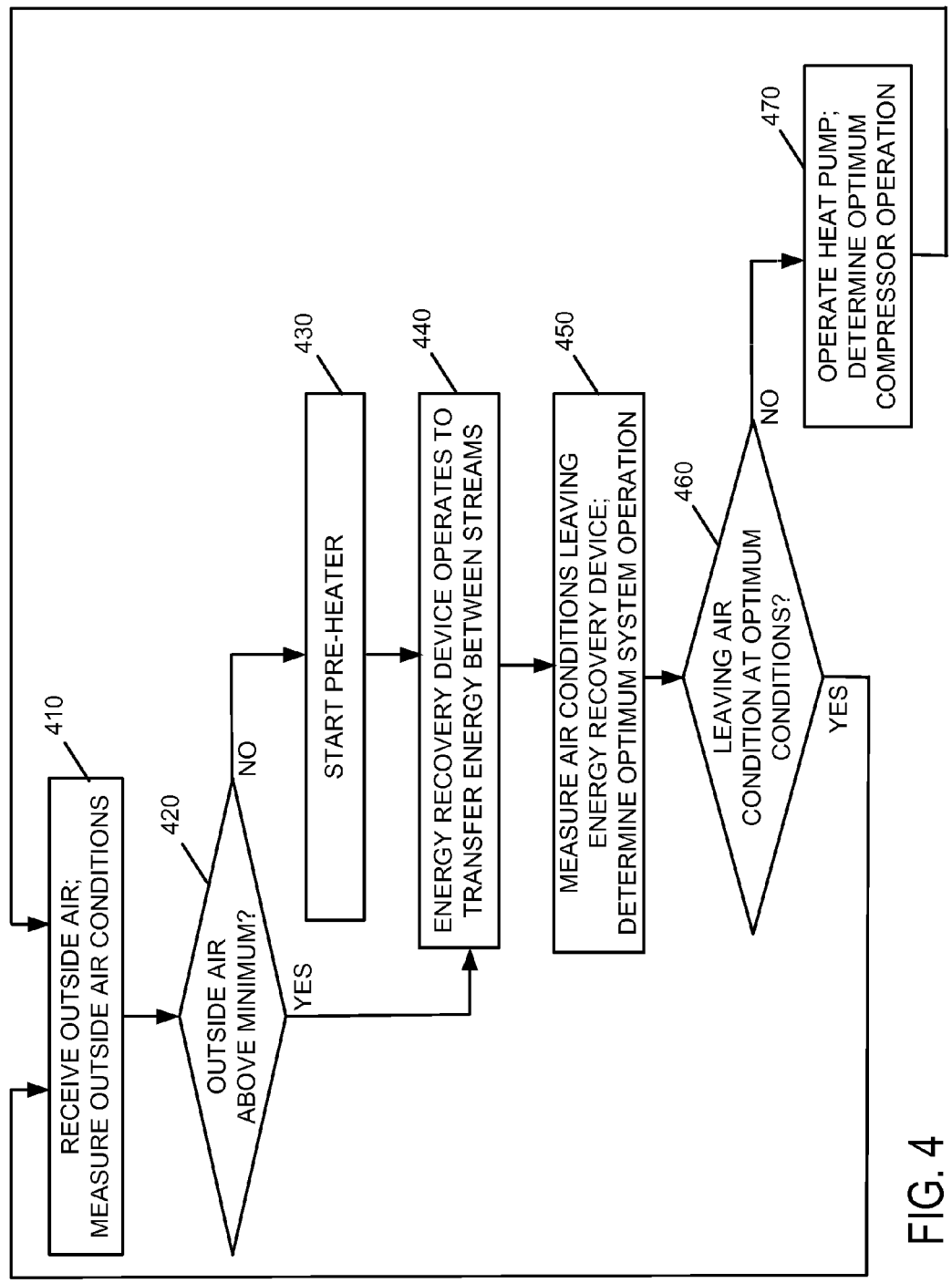
FIG. 4 is a flow diagram illustrating exemplary processing associated with operation of the ventilation unit of FIG. 1.

FIG. 4 is a flow diagram of exemplary processing associated with operation of ventilation unit 100. Processing may begin with outside air entering ventilation unit 100 (act 410). For example, outside air may enter intake air chamber 105 of ventilation unit 100 via louvered openings or other types of openings in one or more sides (and/or top of unit 100), as illustrated in FIG. 1A. In addition, in some implementations, the outside air passes through filters 108 (FIG. 3A).

Control unit 190 may measure the outside air conditions (act 410). For example, one of sensors 240 located in intake air chamber 105 may measure the air temperature of the outdoor air received in intake air chamber 105. One of sensors 240 may also measure the relative humidity of the outside air.

As described previously, control unit 190 may include a pre-stored minimum air temperature allowed by energy recovery device 120. For example, memory 230 may store a minimum air temperature that corresponds to the minimum air temperature that energy recovery device 120 may receive. That is, energy recovery device 120 may operate most efficiently when the incoming air temperature is above a predetermined minimum temperature.

Processor 220 may determine if the outside air temperature is above the minimum air temperature (act 420). In an exemplary implementation, the minimum temperature may be 0° F. It should be understood that in other implementations, other minimum temperatures may be used. In each case, if processor 220 determines that the outside air is not above the minimum (act 420—no), processor 220 may activate accessory pre-heater 110 (act 430). Pre-heater 110 may be activated to pre-heat the outdoor air prior to the outdoor air coming into contact with energy recovery device 120. In one implementation, pre-heater 110 may include an electric heater used to heat the incoming air to a temperature above the minimum threshold. One of sensors 240 may measure air temperature after the air is heated by pre-heater 110. Processor 220 may then determine at what level preheater 110 may be activated (e.g., full power, half power, etc.).

Energy recovery device 120 as described above, may include a desiccant air exchanger in the form of an enthalpy wheel. That is, energy recovery device 120 may transfer both sensible heat in the form of a temperature difference and latent heat in the form of moisture difference between a return/exhaust air stream and a supply air stream. Returning to FIG. 4, after the outside air is preheated, or if the outside air does not need to be heated (i.e., the outside air temperature is above the minimum) (act 420—yes), the outside air comes into contact with energy recovery device 120. Energy recovery device 120 may receive the supply air stream and operate to transfer energy in the form of temperature between the return/exhaust air stream and the supply air stream without mixing the streams (act 440). For example, during cold weather, the cold outdoor air in the supply air stream is heated by the warmer indoor air in the return air stream. During warm weather, the hot outdoor air in the supply air stream is cooled by the colder indoor air in the return air stream. However, the actual air streams are not mixed by energy recovery device 120.

In addition, as discussed above, energy recovery device 120 is located within ventilation unit 100 such that it is the first device that exchanges air from the return air stream to the supply air stream. This location allows energy recovery device 120 to obtain maximum energy recovery. This location also allows energy recovery device 120 to condition the fresh air first with the least amount of energy usage. In some instances, if energy recovery device 120 conditions the air adequately based on the desired operating conditions set by the building engineer/technician, the heat pump system may not have to further condition the air or may have to work less to further condition the air.

After the air passes through energy recovery device 120, control unit 190 may measure various conditions associated with the air leaving energy recovery device 120 and determine optimum system operation (act 450). For example, one of sensors 240 located in an area on the output side of energy recovery device 120 may measure the temperature of the air and the relative humidity of the air. Processor 220 may determine if the leaving conditions of the air are within the optimum range required for the indoor space (act 460). For example, if the temperature and relative humidity are within the desired range (act 460—yes), the heat pump system may not be needed to further condition the air. In this case, the air stream leaving energy recovery device 120 may be provided to air mover device 140, where it is supplied to the indoor space.

If, however, the leaving air conditions are not within the required range (act 460—no), the supply air stream may pass through the heat pump system where it is further cooled or heated to meet the desired leaving air temperature and humidity conditions (act 470). For example, during the cooling mode, coil 130 may act as an evaporator 130 and coil 180 may act as a condenser. In this case, the heat pump system may further cool the supply air stream to the pre-set conditions stored in memory 230 of control unit 190 and output air to air mover device 140 at the precise temperature and humidity that is required. Because the air is preconditioned by energy recovery device 120, evaporator coil 130 uses less energy to condition the fresh air stream, when compared to conventional devices. That is, conventional devices typically must lower the air temperature below the dew point and then re-heat the air.

In an exemplary implementation, control unit 190 operates ventilation unit 100 in a cooling mode such that 95° F. outdoor air may be provided to an indoor space at temperatures ranging from 68-75° F. with a dew point less than 58° F. Alternatively, control unit 190 may operate ventilation unit 100 to deliver additional cooling or heating based on the outdoor air conditions and user provided control parameters. In each case, ventilation unit 100 may operate under a wide variety of environmental conditions to provide ventilation and conditioned air to an indoor space.

In addition, control unit 190 may precisely control the leaving air conditions in both the cooling and heating modes. For example, in an exemplary implementation, compressor 150 may be a variable speed/capacity or modulating compressor that precisely controls the operations of evaporator/condenser coil 130 to ensure that ventilation unit 100 does not over heat or over cool the leaving air. That is, processor 220 may determine the optimum operating speed and other parameters associated with compressor 150 to optimize operation of the heat pump system (act 470). As a result, significantly lower energy usage across the entire range of fresh air conditions may be obtained. In addition, using a modulating compressor 150 that operates under control of control unit 190 may avoid defrost cycles for the heat pump system, which would otherwise turn off ventilation unit 100 capabilities.

As the fresh air is expelled to the indoor air space, return air is received by ventilation unit 100 from the indoor space via, for example, duct work located in the indoor space. For example, the return air may be received in return air chamber 175 (FIG. 1B). As described above, the return air stream may enter chamber 175 and come into contact with energy recovery device 120, where energy from the return air stream in the form of heat energy may be transferred to the incoming air stream. One or more of sensors 240 located in return air chamber 175 and downstream of energy recovery device 120 may measure the return air conditions to determine the energy recovery efficiency. In an exemplary implementation, the energy recovery efficiency may range from about 30% to about 90%. Processor 220 may use this information to further refine the setting of the components of ventilation unit 100, as well as control the overall operation of ventilation unit 100. For example, processor 220 may determine the optimal setting for compressor 150 to maximize efficiency of the heat pump system. In this manner, ventilation unit 100 may provide ventilation air that is conditioned to the desired temperature and relative humidity.

As described above, sensors 240 may include one or more sensors to measure relative humidity, air volume, air quality, air pressure, air enthalpy refrigerant pressure, refrigerant flow, compressor power, compressor status, fan motor power, fan motor status, etc. In some implementations, however, ventilation unit 100 may determine various conditions or characteristic of air or one of the components of ventilation unit 100 without having a direct sensor to measure the characteristic. That is, ventilation unit 100 may determine various characteristics using "pseudo sensors" that do not directly measure the particular characteristic.

For example, in one implementation, ventilation unit 100 may not include an outdoor air humidity sensor. In this case, ventilation unit 100 may turn off energy recovery device 120 (e.g., an energy recovery wheel) while air mover device 140 (e.g., the supply fan) is running. A humidity sensor located downstream of energy recovery device 120 may then effectively measure the outdoor air humidity when energy recovery device 120 is turned off. In this manner, the outdoor air humidity may be detected without having a specific humidity sensor located outdoors. The outdoor air humidity value may then be used to determine an appropriate mode of operation for ventilation unit 100, or other determine other operating/diagnostic functions. Ventilation unit 100 may determine other environmental or component characteristics, such as return air temperature, exhaust air temperature, outside air enthalpy, etc., using pseudo sensors and without requiring a dedicated sensor to sense each particular parameter. These determined values may then be used in the same manner as if a dedicated sensor was used to directly measure the value.

Ventilation unit 100 may also use the values obtained via the pseudo sensors, along with values obtained via the physical sensors 240, to determine among other things, the efficiency of energy recovery device 120, DX heat pump system effectiveness, air moving status and other meaningful performance measures that aid in the operation of ventilation unit 100. The pseudo sensors, physical sensors and performance measures may also be used to determine ventilation unit 100 status, the mode of operation of ventilation unit 100, fault conditions associated with ventilation unit 100, etc. Control unit 190 may then operate/control ventilation unit 100 to maintain the highest efficiency, maintain limited operation in fault conditions or shut ventilation unit 100 off. Control unit 190 may also allow for intelligent and automatic return to normal operation of ventilation unit 100 when conditions change that allow for normal operation.

In some implementations, ventilation unit 100 may use the pseudo sensors to save input/output space associated with control unit 190. For example, in some implementations, input device 250 of control unit 190 may include a limited number of input/outputs for receiving input from external sensors. In such a case, use of pseudo sensors may conserve the limited number of inputs from external sensors.

In still other implementations, pseudo sensors may be used when a physical sensor fails. For example, if a physical sensor associated with measuring a particular parameter fails, control unit 190 may control one or more components to gain information needed to deduce the particular parameter. In this manner, ventilation unit 100 may continue to operate if one or more sensors fails.

Ventilation unit 100, consistent with implementations described herein, may operate over a wide range of environmental conditions (e.g., −20° F. to 110° F.) without requiring supplemental heating or coil defrosting to maintain proper operations. Ventilation unit 100 may also be compact in size, thereby saving space and installation time.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments.

For example, implementations described above refer to energy recovery device 120 being a desiccant wheel that transfers heat energy and moisture between air streams. In some implementations, control unit 190 may vary the speed of the desiccant wheel to optimize the energy transfer. For example, control unit 190 may operate the desiccant wheel at a first speed based on conditions associated with the air leaving energy recovery device 120 and determine that the speed of the desiccant wheel may be increased to gain additional efficiency. In this case, control unit 190 may increase the speed of the desiccant wheel. In other situations, the speed of the desiccant wheel may be decreased to increase heat pump efficiency. In still other implementations, the speed of the desiccant wheel may be set to a value to provide optimum efficiency over a wide range of conditions. In such implementations, the speed of the desiccant wheel will not typically vary over relatively long periods of time (e.g., eight hours or more).

In addition, in some implementations, ventilation unit 100 may only provide sensible heat transfer, as opposed to sensible and latent heat transfer. In such implementations, energy recovery device 120 may include a sensible plate core, enthalpy plate core, sensible exchange wheel or other energy exchange device that transfers energy in the form of heat, but not moisture between air streams.

Implementations have also been described above as providing bypass air through an opening 112 that may include damper 115. In other implementations, outside air may be provided to exhaust air chamber 185 via other mechanisms. For example, exhaust air chamber 185 may include one or more louvered openings or other openings that provides outdoor air directly into exhaust air chamber 185 and to coil 180.

In still other implementations, air from the return air stream may be used as "bypass air" provided to coil 180. For example, return air chamber 175 may include a duct, passageway or other opening that connects return air chamber 175 to exhaust air chamber 185, bypassing energy recovery device 120. The air from the return air stream may then be provided to coil 180. In this implementation, the amount of return air provided to coil 180 may be controlled based on, for example, the size of the duct or passageway connecting return air chamber 175 and exhaust air chamber 185. In each case, the amount of additional or bypass air provided to coil 180 may allow for additional heat recovery from the heat pump system.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above mentioned description is to be considered exemplary, rather than limiting, and the true scope of the invention is that defined in the following claims.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. An integrated ventilation unit configured to provide ventilation and conditioned air to an indoor space, comprising:
   a heat pump system comprising:
      a first coil located at a supply air side of the ventilation unit; and
      a second coil located at an exhaust air side of the ventilation unit, and a compressor;
   a passageway or opening configured to provide outside air to the second coil of the heat pump system;
      an energy recovery device located upstream of the first coil with respect to a supply air stream, and upstream of the second coil with respect to a return air stream, the energy recovery device being configured to transfer heat between the return air stream and the supply air stream;
   a return air chamber configured to receive return air from the indoor space;
   an exhaust air chamber, wherein the second coil is located in the exhaust air chamber;
   a passageway or duct connecting the return air chamber to the exhaust air chamber, the passageway or duct bypassing the energy recovery device and being configured to provide return air to the second coil; and a control unit configured to control operation of the heat pump system and the energy recovery device.

2. The ventilation unit of claim 1, further comprising:
an intake air chamber configured to receive outside air; and
a heater located adjacent the intake air chamber, wherein the control unit is configured to:
determine whether the outside air is less than a predetermined value, and activate the heater when the outside air is less than the predetermined value.

3. The ventilation unit of claim 1, wherein an amount of air provided to the second coil is greater than an amount of air provided to the first coil.

4. The ventilation unit of claim 1, wherein the compressor comprises at least one of a variable speed or variable capacity compressor, and wherein the control unit is configured to vary the speed of the variable speed compressor or variable capacity compressor based on conditions associated with air exiting the supply air side of the ventilation unit.

5. The ventilation unit of claim 1, wherein the energy recovery device is further configured to transfer moisture between the return air stream and the supply air stream.

6. The ventilation unit of claim 1, wherein the energy recovery device comprises a desiccant wheel, and wherein the control unit is further configured to:
at least one of vary the speed, turn off or turn on the desiccant wheel based on environmental conditions associated with at least one of the supply air stream and the return air stream.

7. The ventilation unit of claim 1, further comprising:
a supply fan configured to supply air to the indoor space; and
an exhaust fan configured to expel air received from the indoor space and outdoor air provided to the second coil, and wherein the control unit is configured to:
control the speed of the supply fan and the exhaust fan.

8. The ventilator unit of claim 1, wherein the components are contained in a single housing.

9. An integrated ventilation unit configured to provide ventilation and conditioned air to an indoor space, comprising:
a heat pump system comprising:
a first coil located at a supply air side of the ventilation unit, a second coil located at an exhaust air side of the ventilation unit, a compressor; and
a reversing valve configured to reverse a flow of the refrigerant from the compressor between the first coil and the second coil;
a passageway or opening configured to provide outside air to the second coil of the heat pump system;
an energy recovery device located upstream of the first coil with respect to a supply air stream, and upstream of the second coil with respect to a return air stream, the energy recovery device being configured to transfer heat between the return air stream and the supply air stream;
a return air chamber configured to receive return air from the indoor space;
an exhaust air chamber, wherein the second coil is located in the exhaust air chamber; and
a control unit configured to control operation of the heat pump system and the energy recovery device.

10. The ventilation unit of claim 9, further comprising:
an intake air chamber configured to receive outside air; and
a heater located adjacent the intake air chamber, wherein the control unit is configured to:
determine whether the outside air is less than a predetermined value, and activate the heater when the outside air is less than the predetermined value.

11. The ventilation unit of claim 9, wherein an amount of air provided to the second coil is greater than an amount of air provided to the first coil.

12. The ventilation unit of claim 9, wherein the compressor comprises at least one of a variable speed or variable capacity compressor, and wherein the control unit is configured to vary the speed of the variable speed compressor or variable capacity compressor based on conditions associated with air exiting the supply air side of the ventilation unit.

13. The ventilation unit of claim 9, wherein the energy recovery device is further configured to transfer moisture between the return air stream and the supply air stream.

14. The ventilation unit of claim 9, wherein the energy recovery device comprises a desiccant wheel, and wherein the control unit is further configured to:
at least one of vary the speed, turn off or turn on the desiccant wheel based on environmental conditions associated with at least one of the supply air stream and the return air stream.

15. The ventilation unit of claim 9, further comprising:
a return air bypass bypassing the energy recovery device and providing return air to the second coil.

16. The ventilation unit of claim 9, wherein the reversing valve is a four way valve.

17. The ventilation unit of claim 9, wherein the outside air bypass is located in an outside air chamber upstream of the energy recovery device.

18. The ventilation unit of claim 9, the ventilation unit further comprising:
a preheater located in the supply air chamber upstream of the energy recovery device.

19. The ventilation unit of claim 18, wherein the control unit is configured to:
determine whether outside air entering an outside air chamber is less than a predetermined value; and
activate the preheater when the outside air is less than the predetermined value.

20. The ventilation unit of claim 9, wherein the control unit is configured to:
determine whether supply air leaving the energy recovery device is at optimum conditions; and
operate the heat pump when the supply air leaving the energy recovery device is not at optimum conditions.

21. The ventilation unit of claim 9, the outside air bypass further comprising a flow control device.

22. The ventilation unit of claim 21, wherein the flow control device is a damper.

23. An integrated ventilation unit configured to provide ventilation and conditioned air to an indoor space, comprising:
a return air chamber, an outside air chamber, a supply air chamber, and an exhaust air chamber;
a heat pump comprising:
a first coil operable as an evaporator and a condenser, the first coil located in the supply air chamber; and
a second coil operable as an evaporator when the first coil is operating as a condenser, the second coil operable as a condenser when the first coil is operating as an evaporator, and the second coil located upstream of an exhaust air chamber and downstream of a return air chamber;

an energy recovery device spanning the supply air chamber and the return air chamber, the energy recovery device located upstream of the first coil in the in the supply air chamber and upstream of the second coil in the return air chamber, the energy recovery device configured to transfer heat between return air and supply air;

an outside air bypass providing outside air to the second coil from the outside air chamber; and a control unit configured to control operation of the heat pump system and the energy recovery device.

* * * * *